United States Patent
Su et al.

(10) Patent No.: US 8,736,776 B2
(45) Date of Patent: May 27, 2014

(54) LIQUID CRYSTAL LENS FOR 3D DISPLAY AND MANUFACTURING METHOD THEREOF

(75) Inventors: Chun-wei Su, New Taipei (TW); Jan-tian Lian, Keelung (TW); Hung-yu Wu, New Taipei (TW)

(73) Assignee: Changhwa Picture Tubes Ltd., Bade (TW)

( * ) Notice: Subject to any disclaimer, the term of this patent is extended or adjusted under 35 U.S.C. 154(b) by 132 days.

(21) Appl. No.: 13/470,314

(22) Filed: May 13, 2012

(65) Prior Publication Data

US 2013/0215340 A1 Aug. 22, 2013

(30) Foreign Application Priority Data

Feb. 16, 2012 (TW) ................ 101105132 A

(51) Int. Cl.
*G02F 1/133* (2006.01)
*G02F 1/13* (2006.01)

(52) U.S. Cl.
USPC ............................. 349/15; 349/200

(58) Field of Classification Search
CPC ................................... G02B 27/2214
USPC ........................................... 349/15, 200
See application file for complete search history.

(56) References Cited

U.S. PATENT DOCUMENTS

2012/0300141 A1* 11/2012 Shin et al. ............... 349/15

FOREIGN PATENT DOCUMENTS

TW 201044079 12/2010

* cited by examiner

*Primary Examiner* — James Dudek
(74) *Attorney, Agent, or Firm* — Mark M. Friedman

(57) ABSTRACT

The present invention provides a liquid crystal lens for a 3D display, which includes a first substrate, a second substrate, a liquid crystal layer, a first electrode layer, and a first alignment layer. The second substrate is disposed corresponding to the first substrate. The liquid crystal layer is disposed between the first substrate and the second substrate. The first electrode layer is disposed on a side of the first substrate facing the second substrate. The first alignment layer is disposed on the first electrode layer. The first alignment layer has a plurality of first regions, and alignment directions of the first regions gradually change from one end to an opposite end and are symmetrical. A manufacturing method thereof is also disclosed.

10 Claims, 7 Drawing Sheets

LIQUID CRYSTAL LENS FOR 3D DISPLAY AND MANUFACTURING METHOD THEREOF

TECHNICAL FIELD OF THE INVENTION

The present invention relates to a liquid crystal (LC) lens and a manufacturing method thereof, and especially to an LC lens for a switchable 2D/3D liquid crystal display (LCD) and a manufacturing method thereof.

BACKGROUND OF THE INVENTION

With the rapid development of display technology in recent years, autostereoscopy is an important developing trend. An autostereoscopic display typically consists of an LCD panel and micro-optical components (e.g. parallax barrier and lenticular lens array). The LCD panel displays an image corresponding to a particular visual range on a corresponding group of pixels, or the LCD panel displays the images corresponding to different visual ranges at different moments. The role of a micro-optical component is to project the image corresponding to a particular visual range into a space corresponding to the particular visual range. Left and right eyes of a viewer see different images when the left and right eyes are respectively located at appropriate visual ranges, so the images are fused in the brain of the viewer and the viewer senses stereoscopic vision.

Referring to FIG. 1, FIG. 1 is a conventional switchable 2D/3D LCD. The switchable 2D/3D LCD 10 includes an LCD panel 12 and a switching 2D/3D layer 14. The LCD panel 12 includes a thin film transistor (TFT) array substrate, liquid crystals, and a color filter substrate, all of which are familiar to those skilled in the art. Thus, no further details will be provided herein. The switching 2D/3D layer 14 includes a lower substrate 142, liquid crystal (LC) molecules 144, an upper substrate 146, a lower electrode 1422, and an upper electrode 1462. The upper electrode 1462 has a plurality of striped gaps or "slits". The principle thereof is described as follows. When applying a voltage, an electric field generated between the upper and lower substrates is non-uniform, and the LC molecules 144 shown in FIG. 1 are arranged along the electric field. Under this condition, for the image within the region, the switching 2D/3D layer 14 is equivalent to a lenticular lens, thereby achieving the effect of a 3D display. Moreover, when no voltage is applied, all the LC molecules 144 are vertically arranged, so that the image within the region can completely pass therethrough, thereby forming the effect of a 2D display of the original LCD panel 12.

However, the above-mentioned switching 2D/3D layer 14 requires a sufficient space between the upper and lower substrates in order to achieve a horizontal distribution of the electric field, so that the LC molecules 144 can be arranged as shown in FIG. 1. Therefore, a cell gap (e.g. about 20 um) between the both substrates of the conventional switching 2D/3D layer 14 can not be effectively reduced, as a result, the thickness of the conventional switching 2D/3D layer 14 is too thick and fails to meet the current trend of a compact size for the display.

SUMMARY OF THE INVENTION

Accordingly, an objective of the present invention is to provide an LC lens for a 3D display to improve the problem of the above-mentioned autostereoscopic display being too thick.

Another objective of the present invention is to provide a method for manufacturing a LC lens for a 3D display to improve the problem of the conventional autostereoscopic display being too thick.

To achieve the foregoing objective, according to an aspect of the present invention, an LC lens for a 3D display which is provided by a preferred embodiment of the present invention includes a first substrate, a second substrate, a liquid crystal layer, a first electrode layer, and a first alignment layer. The second substrate herein is disposed opposite to the first substrate. The liquid crystal layer is disposed between the first substrate and the second substrate. The first electrode layer is disposed on one side of the first substrate facing the second substrate. The first alignment layer is disposed on the first electrode layer. The first alignment layer has a plurality of first regions, wherein alignment directions of the first regions gradually change from one end to an opposite end and are symmetrical.

In one preferred embodiment, the first regions are shaped as a plurality of strips, and the strips are sequentially arranged to be adjacent to each other. Moreover, the alignment directions of the first regions of the first alignment layer are symmetric with respect to a straight line, and the straight line is parallel to a long side of the strips and divides the first alignment layer into two symmetrical halves.

In one preferred embodiment, the first alignment layer is a photo-alignment layer.

In one preferred embodiment, the first substrate and the second substrate are flexible substrates.

In one preferred embodiment, the LC lens for the 3D display further includes a second electrode layer and a second alignment layer. The second electrode layer is disposed on one side of the second substrate facing the first substrate. The second alignment layer is disposed on the second electrode layer. The second alignment layer has a plurality of second regions corresponding to the first regions, wherein alignment directions of the second regions correspond to the first regions.

To achieve another objective, a method for manufacturing a liquid crystal lens for a 3D display which is provided by a preferred embodiment of the present invention includes the steps of: forming an electrode layer on a substrate; coating a photo-alignment layer on the electrode layer; dividing the photo-alignment layer into a plurality of regions; respectively irradiating the regions by an ultraviolet light with a photomask; and assembling the substrate being filled with liquid crystals.

In one preferred embodiment, the step of irradiating the regions comprises respectively irradiating different regions of the photo-alignment layer by the ultraviolet light with the photomask, and a directional difference between the two irradiations corresponding to any two adjacent regions is a predetermined angle. Furthermore, the ultraviolet light has a constant polarization state.

In another preferred embodiment, the step of irradiating the regions comprises respectively irradiating different regions of the photo-alignment layer by the ultraviolet light with the photomask, and corresponding directions of the irradiations to all the regions are the same. Furthermore, the ultraviolet light has a plurality of polarization states with a constant difference between any two adjacent irradiations.

The photo-alignment layer according to the present invention can be divided into the plurality of regions with the different alignment directions by the ultraviolet light irradiating in the different directions, so that the LC molecules within the regions tilt along the different alignment directions of the alignment layer to achieve the effect of the LC lens.

Therefore, the LC lens of the present invention has the effect of the 3D display without applying the voltage, and the problem, which the conventional autostereoscopic display is too thick, is also solved for achieving the objectives of the present invention.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
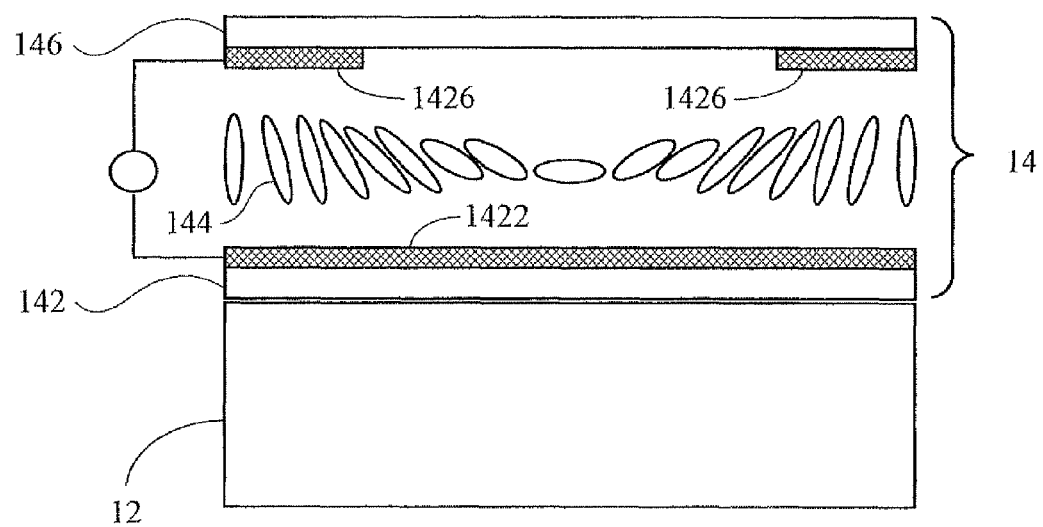
FIG. 1 is a conventional switchable 2D/3D LCD.
Figure 2:
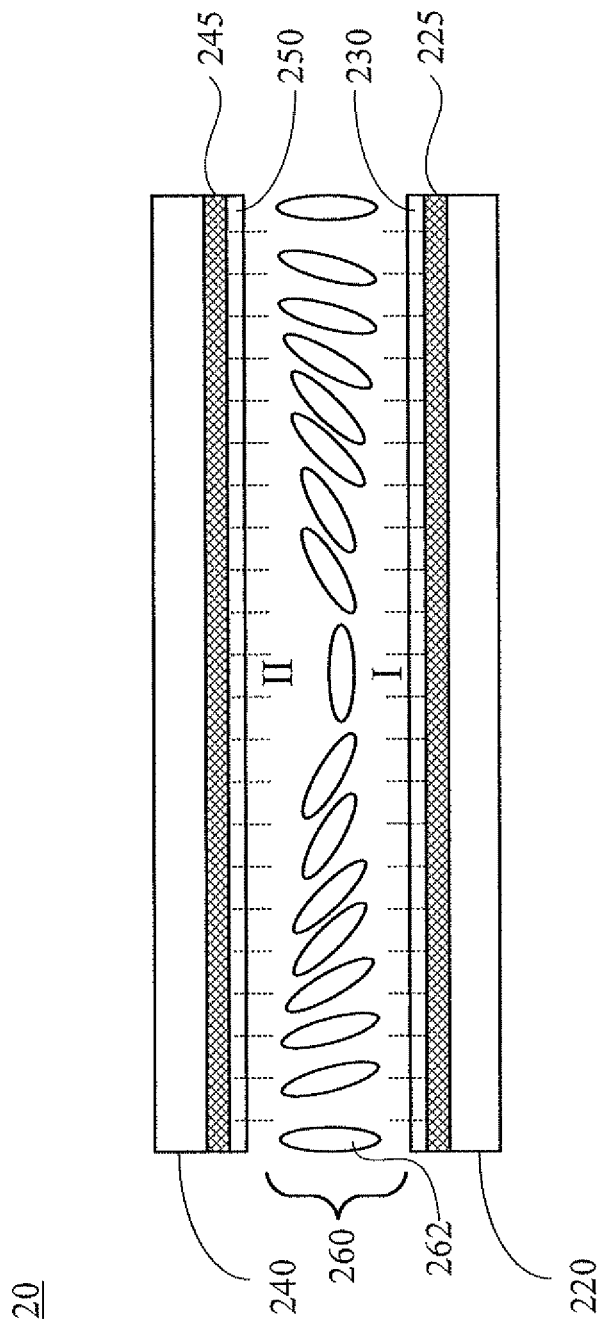
FIG. 2 depicts a schematic cross-sectional diagram illustrating an LC lens for a 3D display according to a preferred embodiment of the present invention.

Referring to FIG. 2, FIG. 2 depicts a schematic cross-sectional diagram illustrating an LC lens for a 3D display according to a preferred embodiment of the present invention. The LC lens 20 in the drawing is a partial cross-sectional view of a switching 2D/3D layer (not shown). The LC lens 20 includes a first substrate 220, a second substrate 240, a liquid crystal layer 260, a first electrode layer 225, a first alignment layer (alignment layer)230, a second electrode layer 245 and a second alignment layer 250.

As shown in FIG. 2, the second substrate 240 is disposed opposite to the first substrate 220, and the liquid crystal layer 260 is disposed between the first substrate 220 and the second substrate 240. The first substrate 220 and the second substrate 240 are glass substrates or flexible substrates. The first electrode layer 225 is disposed on one side of the first substrate 220 facing the second substrate 240. The first electrode layer 225 is a transparent electrode preferably, and the material thereof is Indium Tin Oxide (ITO) or Indium Zinc Oxide (IZO).

The first alignment layer 230 is disposed on the first electrode layer 225. The first alignment layer 230 is used for guiding LC molecules 262, thereby making the LC molecules 262 tilt along the alignment direction of the alignment layer. Specifically, the first alignment layer 230 has a plurality of first regions I, wherein the alignment directions of the first regions gradually change from one end to an opposite end and are symmetrical, so that the LC molecule 262 are arranged as shown in FIG. 2. Specifically, the alignment directions of the first regions I at the both sides are vertical, so that the tilted directions of the liquid crystal molecule 262 at two sides of the liquid crystal layer 260 are vertical. Subsequently, the alignment directions of the first regions I are gradually horizontal from the both sides to the center of the first region for the LC molecules 262 to gradually tilt toward the horizontal direction, thereby reaching the effect of the LC lens.

It should be noted that widths of the first regions I in the present invention are not limited, but the LC lens should be divided into five or more equal portions by the first regions I preferably for obtaining a better effect of the lens. The first regions I are shaped as a plurality of stripes (long sides thereof are perpendicular to a piece of paper), and the strips as shown in the drawing are sequentially arranged to be adjacent to each other. Moreover, the alignment directions of the first regions I are symmetric with respect to a straight line (located at the center of the LC lens 20), and the straight line is parallel to the long sides of the strips and divides the first alignment layer 230 into two symmetrical halves.

In the preferred embodiment, the first alignment layer 230 is a photo-alignment layer, and the photo-alignment material thereof is polyimide (PI) with a photo-induced decomposition mechanism. The photo-alignment layer can be induced by polarized ultraviolet light (UV) irradiations in a particular direction to form anisotropic decomposition, so as to reach the alignment effect.

Similarly, the second electrode layer 245 is disposed on one side of the second substrate 240 facing the first substrate 220. The second alignment layer 250 is disposed on the second electrode layer 245. The second electrode layer 245 is a transparent electrode preferably, and the material thereof is Indium Tin Oxide (ITO) or Indium Zinc Oxide (IZO). The second alignment layer 250 has a plurality of second regions II corresponding to the first regions I, wherein alignment directions of the second regions II correspond to the first regions I, so that the liquid crystal molecule 262 are arranged as shown in FIG. 2. Specifically, the alignment directions of the second regions II at the both sides are vertical, so that tilted directions of the liquid crystal molecule 262 at two sides of the liquid crystal layer 260 are vertical. Subsequently, the alignment directions of the second region II are gradually horizontal from the both sides to the center of the first region for the LC molecules 262 gradually tilting toward the horizontal direction, thereby reaching the effect of the LC lens.

Similarly, the present invention is not limited by the widths of the second regions II, but the LC lens should be preferably divided into five or more equal portions by the second regions II for obtaining a better effect of the lens. The second regions II are shaped as a plurality of strips (long sides thereof are perpendicular to a piece of paper), and the strips as shown in the drawing are sequentially arranged to be adjacent to each other. Moreover, the alignment directions of the second regions II are symmetric with respect to a straight line (located at the center of the LC lens 20), and the straight line is parallel to the long sides of the strips and divides the second alignment layer 250 into two symmetrical halves. In addition, the second alignment layer 250 is also a photo-alignment layer.

It is worth mentioning that the LC lens 20 of the embodiment can reach the effect of the LC lens as shown in the drawing without applying voltage to the first electrode layer 225 and/or second electrode layer 245, so that the switching 2D/3D layer implemented according to the LC lens 20 is at the state of the 3D display. It can be seen from the foregoing that the LC lens of the present invention doesn't depend upon the electrical field generated by applying the voltage to guide the LC molecules 262. Therefore, the cell gap between the first substrate 220 and the second substrate 240 needs not much thickness, and the problem that the cell gap between the upper and lower substrates can not be effectively reduced is solved. On the other hand, because the LC lens of the present invention doesn't depend upon the electrical field generated by applying the voltage to guide the LC molecules 262, the LC lens can be used for a flexible LCD which can properly display the 3D effect without the effect of the electrical field when flexed.

Figure 3:
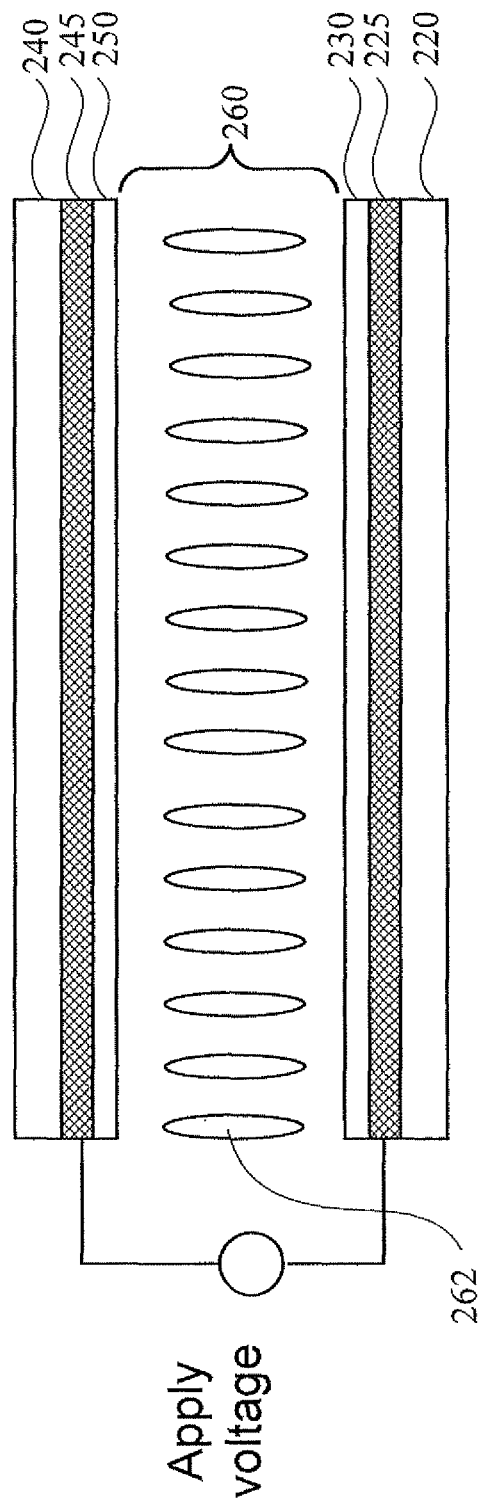
FIG. 3 is a schematic cross-sectional diagram illustrating the LC lens with applied voltage in FIG. 2.

Referring to FIG. 3, FIG. 3 is a schematic cross-sectional diagram illustrating the LC lens with applied voltage in FIG. 2. If the switching 2D/3D layer implemented according to the LC lens 20 needs to be switched to the state of the 2D display, the voltage is only applied to the first electrode layer 225 and/or the second electrode layer 245, so that all the LC molecules 262 within the liquid crystal layer 260 are vertical, not generating the lens effect. Therefore, the switching speed of the switching 2D/3D layer of the embodiment is faster than that of the conventional switching 2D/3D layer.

Figure 4:
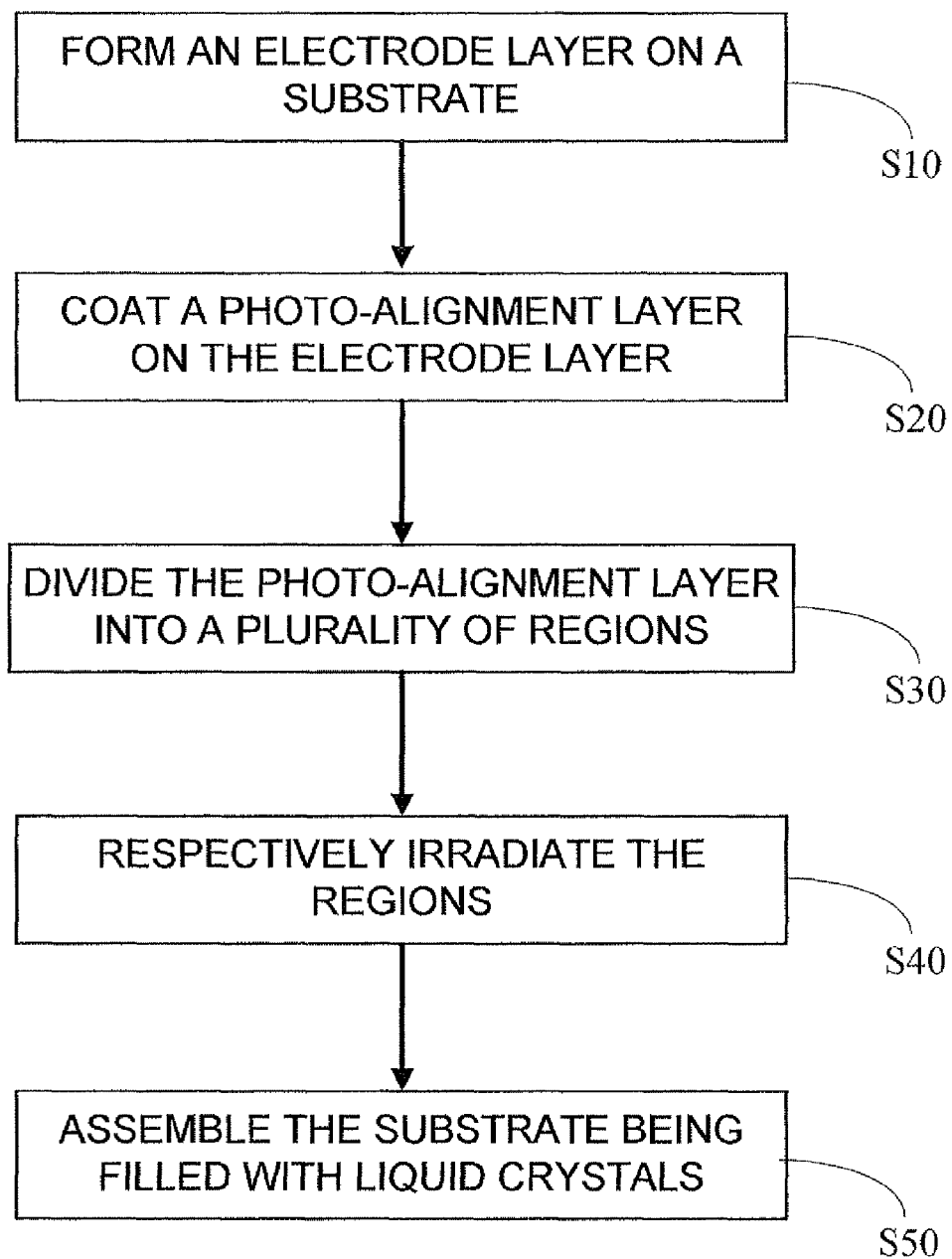
FIG. 4 is a flow chart illustrating a method for manufacturing the LC lens in the embodiment.
Figure 5:
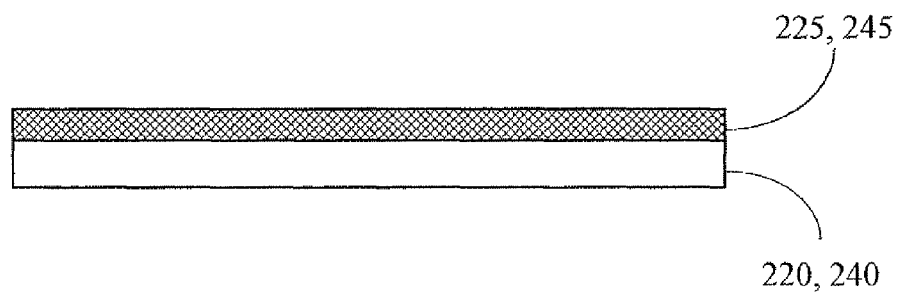
FIG. 5 is a schematic drawing illustrating the step S10.
Figure 6:
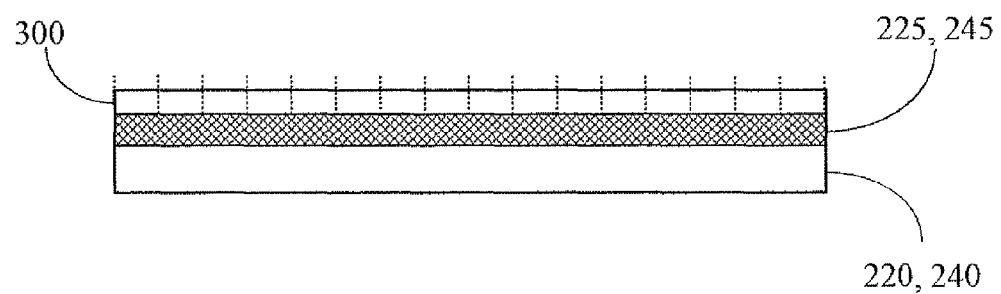
FIG. 6 is a schematic drawing illustrating step S20 and S30.
Figure 7A:
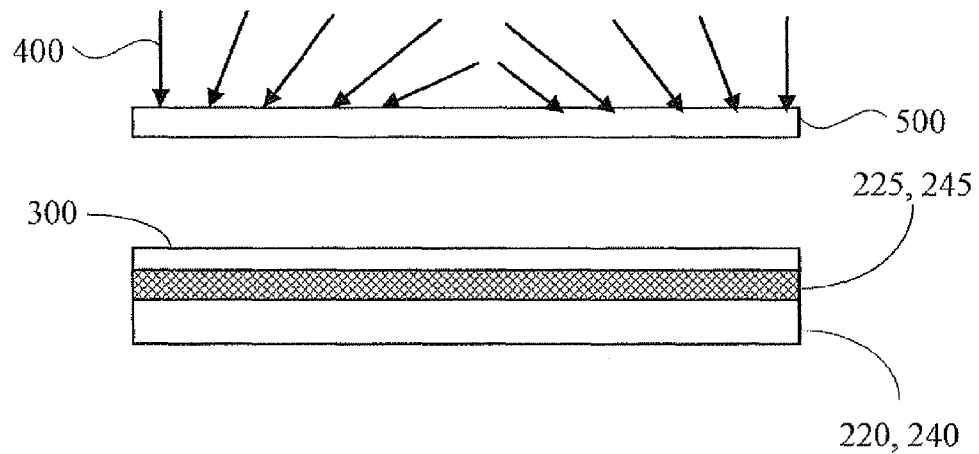
FIG. 7A is a schematic drawing illustrating step S40 according to a preferred embodiment.
Figure 7B:
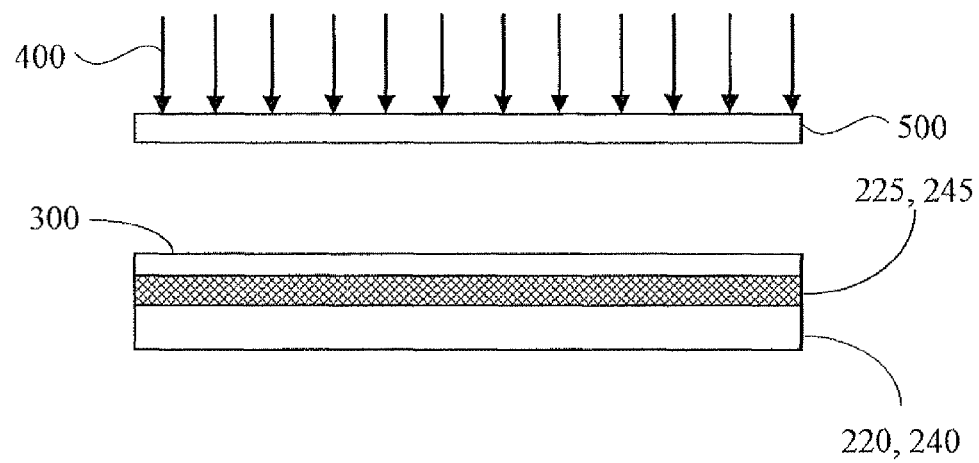
FIG. 7B is a schematic drawing illustrating step S40 according to another preferred embodiment.
Figure 8:
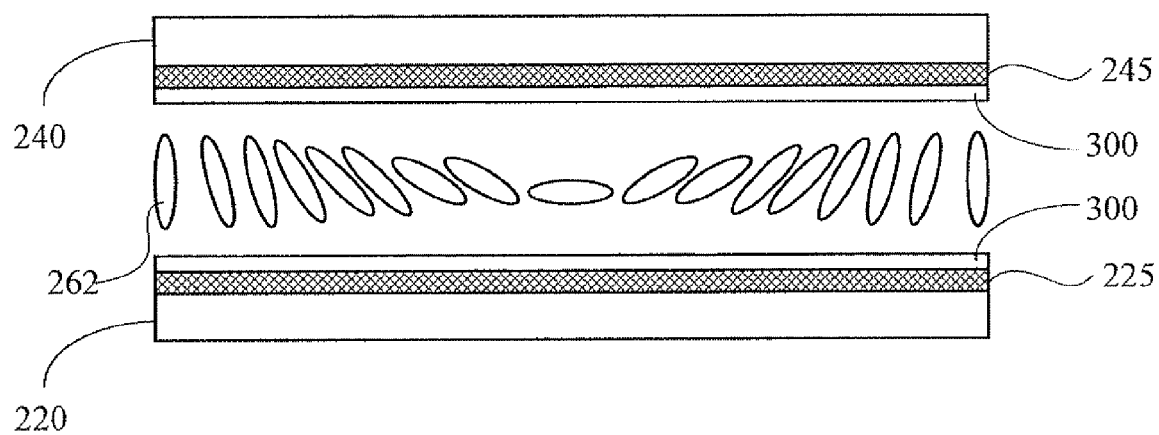
FIG. 8 is a schematic drawing illustrating step S50.

The manufacturing method of the LC lens 20 in the embodiment will be explained in detail accompanying with FIG. 4 to FIG. 8 in the following. FIG. 4 is a flow chart illustrating a method for manufacturing the LC lens in the embodiment. FIG. 5 is a schematic drawing illustrating the step S10, and FIG. 6 is a schematic drawing illustrating step S20 and S30. FIG. 7A is a schematic drawing illustrating step S40 according to a preferred embodiment, and FIG. 7B is a schematic drawing illustrating step S40 according to another preferred embodiment. FIG. 8 is a schematic drawing illustrating step S50. The manufacturing method begins with step S10.

Referring to FIG. 5, at step S10, an electrode layer is formed on a substrate. Specifically, firstly, a glass substrate or a plastic substrate (flexible substrate) is fully coated with ITO for that forming a transparent conductive layer. It is worth mentioning that the substrate can be the above-mentioned first substrate 220 or the second substrate 240, and the electrode layer can be the first electrode layer 225 and the second electrode layer 245.

Referring to FIG. 6, at step S20, a photo-alignment layer 300 is coated on the electrode layer. Specifically, after coating the ITO completely, a photo-alignment layer 300 is fully coated thereon. Similarly, the photo-alignment layer 300 can be the above-mentioned first alignment layer 230 or the second alignment layer 250 being in a state without an alignment process.

Referring to FIG. 6 again, at step S30, the photo-alignment layer 300 is divided into a plurality of regions as shown in the above-mentioned first regions or the second regions II.

Referring to FIG. 7A, at step S40, an ultraviolet light 400 (as shown in an arrow) with a photomask 500 is employed to respectively irradiate the regions. In one preferred embodiment, the ultraviolet light 400 with the photomask 500 respectively irradiates different regions of the photo-alignment layer 300, and a directional difference between the two irradiations corresponding to any two adjacent regions is a predetermined angle. Moreover, the ultraviolet light 400 has a constant polarization state. For example, the direction of irradiating a first area is perpendicular to the photomask 500, as the leftmost arrow shown. It should be noted that a transparent region of the photomask 500 is designed to correspond the leftmost region of the photo-alignment layer 300, so that the alignment direction of the region is vertical. The angle difference between the directions for irradiating the first area and the second area is the predetermined angle, e.g., 20 degrees. The transparent region of the photomask 500 is designed to correspond the region that is adjacent to the leftmost region of the photo-alignment layer 300, so that the alignment direction of the region has a 20 degrees angle with the vertical direction. The rest may be deduced by analogy, and the alignment layer has the numerous alignment directions changing gradually as shown in FIG. 2. It is worth mentioning that the photomasks 500 for numerously irradi-ating can be a same photomask. The photomask only requires being shifted to a constant distance in every irradiation, thereby saving the cost of the photomasks.

Referring to FIG. 7B, in another preferred embodiment, at step S40, the ultraviolet light 400 with the photomask 500 respectively irradiates different regions of the photo-alignment layer 300, and the directions of the irradiations corresponding to all the regions are the same. Furthermore, the ultraviolet light 400 has a plurality of polarization states with a constant difference between any two adjacent irradiations. For example, when irradiating the first area, the polarization state of the ultraviolet light 400 can be controlled for the alignment direction of the irradiated photo-alignment layer 300 is vertical. It should be noted that a transparent region of the photomask 500 is designed to correspond the leftmost region of the photo-alignment layer 300, so that the alignment direction of the region is vertical. The polarization states for irradiating the first area and the second area have a constant difference, which can be a polarization angle or the degree changing from linear polarization to circular polarization. The transparent region of the photomask 500 is designed to correspond the region that is adjacent to the leftmost region of the photo-alignment layer 300, so that the alignment direction of the region has an angle with the vertical direction. The rest may be deduced by analogy, and the alignment layer has the numerous alignment directions changing gradually as shown in FIG. 2. Similarly, the photomasks 500 for numerously irradiating can be a same photomask. The photomask only requires being shifted to a constant distance in every irradiation, thereby saving the cost of the photomasks.

Referring to FIG. 8, at step S50, the substrate is assembled to be filled with liquid crystals. For example, a cell process is performed for the first substrate 220 and the second substrate 240 having the electrode layer and the photo-alignment layer 300. It is the steps of filling the LC molecules, and so on which are well-known to a person skilled in the art. Thus, no further detail will be provided herein.

In summary, the photo-alignment layer 300 according to the present invention can be divided into the plurality of regions with the different alignment directions by the ultraviolet light 400 irradiating in the different directions, so that the LC molecules 262 within the regions tilt along the different alignment directions of the photo-alignment layer 300 to achieve the effect of the LC lens. Therefore, the LC lens of the present invention has the effect of the 3D display without applying the voltage, and the problem that the conventional autostereoscopic display is too thick is also solved for achieving the objectives of the present invention.

While the preferred embodiments of the present invention have been illustrated and described in detail, various modifications and alterations can be made by persons skilled in this art. The embodiment of the present invention is therefore described in an illustrative but not restrictive sense.

What is claimed is:

1. A liquid crystal lens for a switchable two dimensional/three-dimensional (2D/3D) display, comprising:
   a first substrate;
   a second substrate disposed opposite to the first substrate;
   a liquid crystal layer disposed between the first substrate and the second substrate;
   a first electrode layer disposed on one side of the first substrate facing the second substrate, and wherein the liquid crystal lens is at a 3D display mode without applying voltage to the first electrode layer and in a 2D display mode with applying voltage to the first electrode layer; and a first alignment layer disposed on the first electrode layer, the first alignment layer having a plurality of first regions which divide the liquid crystal lens into a plurality of equal portions, wherein alignment directions of the first regions gradually change from one end to an opposite end and are symmetrical, and wherein the alignment directions are identical in each of the first regions.

2. The liquid crystal lens of claim 1, wherein the first regions are shaped as a plurality of strips, and the strips are sequentially arranged to be adjacent to each other.

3. The liquid crystal lens of claim 2, wherein the alignment directions of the first regions of the first alignment layer are symmetric with respect to a straight line, and the straight line is parallel to a long side of the strip and divides the first alignment layer into two symmetrical halves.

4. The liquid crystal lens of claim 1, wherein the first alignment layer is a photo-alignment layer.

5. The liquid crystal lens of claim 1, wherein the first substrate and the second substrate are flexible substrates.

6. The liquid crystal lens of claim 1, further comprising:
a second electrode layer disposed on one side of the second substrate facing the first substrate; and
a second alignment layer disposed on the second electrode layer, the second alignment layer having a plurality of second regions corresponding to the first regions, wherein alignment directions of the second regions correspond to the first regions.

7. A method for manufacturing a liquid crystal lens for a switchable 2D/3D display, comprising the steps of:
forming an electrode layer on a substrate;
coating a photo-alignment layer on the electrode layer;
dividing the photo-alignment layer into a plurality of regions which divide the liquid crystal lens into a plurality of equal portions;
respectively irradiating the regions by an ultraviolet light with a photomask such that alignment directions are identified in each of the regions, wherein the step of irradiating the regions comprises respectively irradiating different regions of the photo-alignment layer by the ultraviolet light with the photomask, and a directional difference between the two irradiations corresponding to any two adjacent regions is a predetermined angle; and
assembling the substrate being filled with liquid crystals.

8. The method of claim 7, wherein the ultraviolet light has a constant polarization state.

9. The method of claim 7, wherein the step of irradiating the regions comprises respectively irradiating different regions of the photo-alignment layer by the ultraviolet light with the photomask, and corresponding directions of the irradiations to all the regions are the same.

10. The method of claim 9, wherein the ultraviolet light has a plurality of polarization states with a constant difference between any two adjacent irradiations.

* * * * *

UNITED STATES PATENT AND TRADEMARK OFFICE
CERTIFICATE OF CORRECTION

PATENT NO.      : 8,736,776 B2
APPLICATION NO. : 13/470314
DATED           : May 27, 2014
INVENTOR(S)     : Chun-wei Su et al.

It is certified that error appears in the above-identified patent and that said Letters Patent is hereby corrected as shown below:

Title page:

Assignee (73) should be corrected as follows:

Change
    -- Chunghwa Picture Tubes Ltd., Bade (TW) --
    to
    "Chunghwa Picture Tubes Ltd., Bade City (TW)"

In the Claims:

Column 8, claim 7:

Line 10 should be corrected as follows:

Change
    -- identified in each of the regions, wherein the step of --
    to
    "identical in each of the regions, wherein the step of"

Signed and Sealed this
Twelfth Day of August, 2014

Michelle K. Lee
*Deputy Director of the United States Patent and Trademark Office*